United States Patent [19]
Young et al.

[11] Patent Number: 6,129,967
[45] Date of Patent: Oct. 10, 2000

[54] COMPOSITE WEAR STRUCTURE AND METHOD OF SECURING CERAMIC TILES THEREIN

[75] Inventors: Lonn M. Young, Columbia Heights; David E. Tweet, Eden Prairie, both of Minn.

[73] Assignee: Tandem Products, Inc., Minneapolis, Minn.

[21] Appl. No.: 09/336,033

[22] Filed: Jun. 18, 1999

[51] Int. Cl.⁷ .................................................. B32B 3/16
[52] U.S. Cl. .................. 428/49; 428/52; 52/386; 52/391
[58] Field of Search .................. 428/49, 52; 52/386, 52/391

[56] References Cited

U.S. PATENT DOCUMENTS

| | | | |
|---|---|---|---|
| 3,624,344 | 11/1971 | Kutzer | 219/127 |
| 4,307,140 | 12/1981 | Davis | 428/86 |
| 5,705,250 | 1/1998 | Hudson, Jr. | 428/99 |

*Primary Examiner*—Alexander S. Thomas
*Attorney, Agent, or Firm*—Nawrocki, Rooney & Sivertson, P.A.

[57] ABSTRACT

An extended wear-life composite wear structure particularly suitable for use as a liner in the form of modular panels, generally including a ceramic layer of spaced apart ceramic tiles, each having at least one anchor receiving structure therethrough, overlying a resilient energy absorbing layer separating the ceramic layer from a base layer, and ceramic tile anchors linking each of the ceramic tiles to the base layer via cooperative engagement with the anchor receiving structures of the ceramic tiles. This composite structure permits independent temporary displacement of each of the tiles upon a surface impact, improved retention of the tiles, and greatly enhances the overall structural integrity of the composite as the intermediate layer, layers and or structures are securely "sandwiched" between the abrasion and impact resistant ceramic layer and the structural base layer.

19 Claims, 1 Drawing Sheet

COMPOSITE WEAR STRUCTURE AND METHOD OF SECURING CERAMIC TILES THEREIN

TECHNICAL FIELD

The present invention relates to an abrasion, impact and vibration resistant composite wear structure suitable for use as a liner, typically in the form of modular panels. More particularly, the present invention relates to an abrasion, impact and vibration resistant composite wear structure having improved structural integrity and an extended wear life, and further relates to a method of resiliently anchoring ceramic tiles in such a composite wear structure.

BACKGROUND OF INVENTION

Ceramic liners are presently used in chutes, hoppers, bins, and other material handling equipment where abrasive or corrosive material would cause such rapid wear that a bear metallic surface would be impractical. A form of ceramic known as "weldable tile" has been used in panels for lining surfaces subject to unusual abrasion. The panels generally include ceramic tiles or blocks fixedly secured directly to a steel substrate by welding. Metal fasteners carried by or retainers carriable by individual tiles are welded to the steel supporting substrate to thereby directly secure each of the tiles. Alternately, ceramic tiles are known to have been cemented or otherwise directly bonded to a supporting substrate, as with polyurethane, Portland cement, epoxy, polyester or silicone based adhesives.

The ceramic tile available for use as a wear resist liner is especially brittle, being particularly susceptible to chipping and breakage when directly affixed to a rigid structural substrate. Premature tile failure frequently occurs in material handling applications where, in addition to surface sliding, surface impacts are present.

One approach at minimizing tile damage in impact applications has been to use tiles whose individual surface area is relatively small. This construction has proved to be labor intensive and thereby costly, and only indirectly addresses the problem of tile damage and dislodgement. Furthermore, liners are known to have been combined with a cushioning substrate so as to form replaceable composite panels which provide areas of coverage in both sliding and impacting contact with such materials as ore, crushed rock, coal, concrete, grain and other abrasive aggregates typical of the mining, foundry, milling and other material handling industries. However, heretofore the structural integrity of such shock absorbing composite wear panels has proven to be suspect and problematic, resulting in premature replacement of either tiles, or in most cases whole panels. Aside from the direct capital costs, unacceptable downtime and losses are typically associated with repair/replacement.

Abrasive resistant ceramic liners, usually in the form of discrete ceramic tiles, have proved difficult to secure to a cushioning substrate so to form a durable panel capable of enduring repeated surface impacts and vibration as applications typically require. Although various primers, pretreatments and adhesives are known, their use for securing ceramic tiles to various cushioning substrates is complex and costly, often times requiring carefully controlled application steps and conditions so as to avoid unpredictable and ultimately unsatisfactory results. Furthermore, when ceramic tiles are exclusively adhered or otherwise affixed to an adjacent cushioning layer, the structural integrity of such composite structure depends not necessarily upon the bond therebetween but upon the weakest of the several bonds, whether mechanical or chemical, between adjacent layers of the composite structure. The structural integrity of the composite panels is only as strong as its "weakest link". It is the "weakest link" of heretofore known composite panels that proves problematic in applications where vibration in combination with surface impacts has led to deterioration of the composite structure so as to render such structures ineffective for their intended purpose.

Where ceramic tiles are effectively "embedded" in a natural or synthetic rubber, effectiveness is limited as the composite structures are subject to unacceptable wearing due to the abrasive material acting directly on the cushioning material surrounding the ceramic tile. This ultimately results in dislodging the otherwise suitable tiles from the composite structure which is thereby ineffective to the point of requiring replacement. Here the "price" of shock absorption is a significant decrease tile retention and thus panel longevity. This is likewise the case where the ceramic tile is affixed to no more than its adjacent layer in the composite structure.

Accordingly, it is therefore advantageous and desirable to provide a ceramic composite that has the impact resistance of energy absorbing/ceramic composites, yet possesses superior structural characteristics which among other things contributes to a greatly extended wear life.

It is likewise advantageous and desirable to provide a method of anchoring ceramic tiles to a support substrate in a way to nonetheless permit individual tiles the freedom to be compressed with the underlying resilient energy absorbing layer and thereby efficiently distribute impact forces imparted thereto.

Similarly, it is desirous to provide a wear structure wherein ceramic tiles are capable of compressive/expansive movement without being pulled from the composite structure.

It is further advantageous to provide an abrasion, impact and vibration resistant wear panel whose surface area has a maximum ceramic tile coverage area (i.e., fewer large tiles versus numerous smaller tiles).

SUMMARY OF THE INVENTION

The present invention is a resilient abrasion resistant composite structure and method of securing ceramic tiles therein. The composite structure is particularly suitable for use as a liner, typically in the form of modular panels, where the combination of abrasion, vibration and surface impacts require superior structural integrity.

The structure includes a ceramic layer of spaced apart ceramic tiles, each having at least a single anchoring structure therethrough. The ceramic layer overlies a resilient energy absorbing layer which substantially separates it from a base or support layer. Ceramic tile anchors link each of the ceramic tiles to the base layer via cooperative engagement with the anchor receiving structures of the tiles. By this construction and arrangement, each of the ceramic tiles is capable of independent temporary resilient displacement along the length of the tile anchor upon a surface impact to the ceramic layer. Furthermore, such anchoring greatly enhances the overall structural integrity of the composite as the intermediate layer, layers and or structures are securedly "sandwiched" between the abrasion and impact resistant ceramic layer and the structural base layer.

The method of securing the ceramic tile in an energy absorbing wear structure includes providing individual ceramic tiles having at least one anchor receiving structure therethrough and a structural base member equipped with ceramic tile anchors. Further steps include anchoring the tiles to the base member and providing a resilient energy absorbing layer to substantially separate the tiles from each other and from the base member.

More specific features and advantages will become apparent with reference to the DETAILED DESCRIPTION OF THE INVENTION, appended claims, and the accompanying drawing figures.

DETAILED DESCRIPTION OF THE INVENTION

Figure 1:
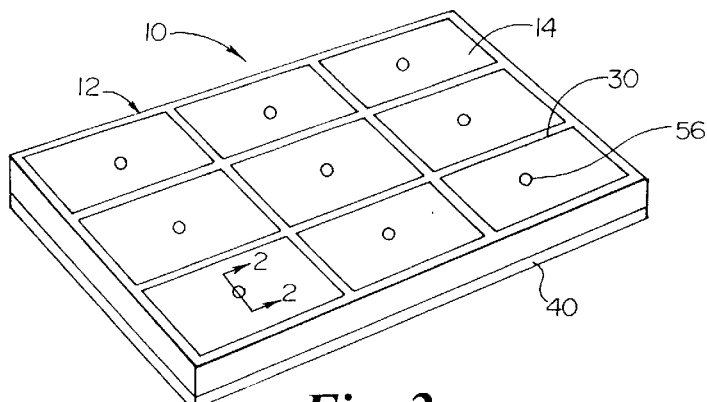
FIG. 1 is a plan view in perspective of an abrasive, impact and vibration resistant panel module embodying the present invention.
Figure 2:
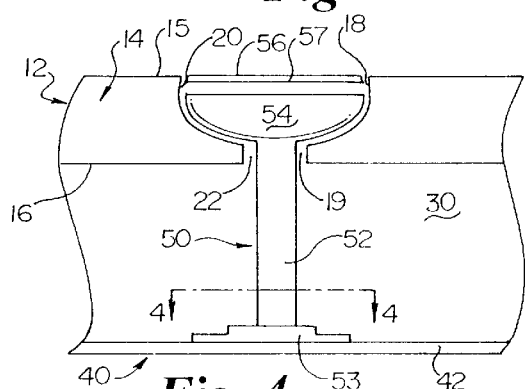
FIG. 2 is a sectional view along line 2—2 of FIG. 1 showing the various layers and features of the composite wear structure and the relationships therebetween.

FIGS. 1 & 2 depict an abrasive, impact and vibration resistant panel module 10 embodying the present invention. The modular panel 10 generally includes a ceramic layer 12 of spaced apart ceramic tiles 14, each having at least one anchor receiving structure 18 therethrough, overlying a resilient energy absorbing layer 30 separating the ceramic layer 12 from a base layer or substrate 40, and ceramic tile anchors 50 linking each of the ceramic tiles 14 to the base layer 40 via cooperative engagement with the anchor receiving structures 18 of the ceramic tiles 14 to effectively securely "sandwich" the intermediate layer, layers or structures, as the case may be, between the outermost layers.

The ceramic tiles 14 of the ceramic layer 12 used to practice the invention are normally an alumina based ceramic, well know to those in the art. By way of illustration, the tiles may comprise approximately 85 to 95% or more aluminum oxide compacted under severe pressure with a binder and usually small amounts of silicon oxide and other materials into the desired configuration. Other ceramic materials could be used which are comprised of other oxides and composites such as zirconia, silicon carbides, alumina zirconia-silica and alumina silicon carbide combinations. It is to be understood that this list is illustrative, and is not intended to be limiting.

Tile geometries contemplated include but are not limited to rectangular, square, round, hexagonal etc. By way of illustration, the tiles may be dimensioned from about 2" by 3" to about 6" by 6" and have a thickness ranging from about 0.25" to 1" or greater. As to be expected, the area of the surface exposed to abrasion and the thickness of the tiles will depend upon the type of abrasion and impact forces to be resisted. The tiles are preferably spaced apart such that they are to some degree, however minimally, physically separated by the resilient energy absorbing layer thereunder. Furthermore, some applications may dictate the presence of a second anchor receiving structure in each of the ceramic tiles to optimally secure the tiles and thereby maintain the overall structural integrity of the structure.

In an effort to achieve maximum structural integrity, the ceramic tiles 14 may be pre-treated for affixedly receiving the resilient energy absorbing layer 30. The pretreatment steps primarily include etching and priming, steps and details of which are known to those skilled in the art. For example, the ceramic tiles are preferably submersed in an etching solution comprising 2,000 grams of water and 25 grams of hydrochloric acid for approximately 30 minutes. After being allowed to dry, a thin even coat of primer comprising 50 volume percent Chemlox 218 and 50 volume percent methyl ethyl ketone is applied. Thereafter the tiles are cured at approximately 250 degrees Fahrenheit for about 2 hours.

Each of the ceramic tiles 14 of the ceramic layer 12 have top 15 and bottom 16 surfaces which define a thickness for the tile 14, with the anchor receiving structures 18 forming a passage 19 from the top surface 15 to the bottom surface 16 of each of the ceramic tiles 14. The anchor receiving structure 18 is preferably configured in cross section as a "chalice" (FIG. 2), a "T" (FIG. 3) or alternately as a "Y" (not shown).

The anchor receiving structure 18 generally comprises an upper socket portion 20 partially extending from the top surface 15 of each of the tiles 14 toward the bottom surface 16 of each of the tiles 14, and a lower bore or bore portion 22 extending from the socket 20 to the bottom surface 16 of each of the tiles 14. Preferably both the socket 20 and the bore 22, in plan view, are round, however this geometry is not exclusive to both or each of the structure portions, however, in all cases the areal extent (i.e., the "footprint") of the socket 20 is greater than that of the bore 22 so as to effectively cooperate with the ceramic tile anchors 50 to secure the tiles 14 in the structure 10. It is not especially critical what portion of the anchor receiving structure vis-a-vis the tile thickness is socket portion versus bore portion, as this is a function of tile geometry, which in turn is application specific.

Figure 3:
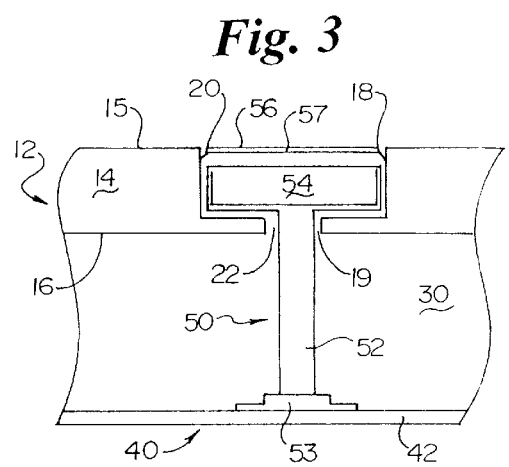
FIG. 3 is a view similar to that of FIG. 2 illustrating an alternate anchor/anchor receiving structure.

The socket 20 preferably has a decreasing dimension throughout its depth. As illustrated in FIG. 2, wherein the socket dimension variably decreases throughout its depth, the socket is shaped as a "bowl" (i.e. concave) to thereby form the aforementioned "chalice" configuration for the anchor receiving structure. Where the socket dimension decreases uniformly throughout its depth, the socket is frustoconical in nature to thereby form the aforementioned "Y" configuration for the anchor receiving structure. As illustrated in FIG. 3, wherein the socket dimension is constant throughout its depth, the socket is cylindrical to thereby form the aforementioned "T" configuration for the anchor receiving structure.

The ceramic layer 12 overlies a resilient energy adsorbing layer 30 which substantially separates the ceramic layer 12 from the base layer 40, and preferably each of the ceramic tiles 14 from each other. This substrate 30 may be homogenous or a laminate, depending upon the desired impact properties necessitated by the application. The resilient energy absorbing layer 30 typically may be a natural rubber or polymerized elastomer, preferably selected from the group consisting of polyvinyl chloride, polyethylene, polystyrene or polyurethane. Polyurethanes are preferred because of their general toughness and abrasion resistance and may be readily formulated to provide a suitable compromise between abrasion resistance and shock absorbing qualities.

Figure 4:
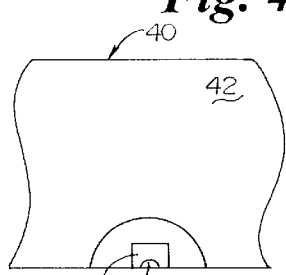
FIG. 4 is a sectional view along line 4—4 of FIG. 2 showing the relationship between the ceramic tile anchors and the base layer.

Each of the ceramic tiles 14 of the ceramic layer 12 of the structure 10 are connected (i.e., linked or anchored) to the base layer or substrate 40 via ceramic tile anchors 50 which extend upwardly therefrom and through the resilient energy absorbing layer 30. The anchors 50 generally comprise spaced apart studs 52 which upwardly project from the base layer 40 and stud heads 54 which are fixed to the "free end" of the stud 52. As shown in FIGS. 2, 3 & 4, the studs 52 may have a base portion 53 to facilitate affixation of the anchor 50 to the base layer 40. The anchors 50 are generally of metallic construction and are preferably welded or otherwise affixed in a spaced apart condition to the base layer 40 for receiving each of the ceramic tiles 14 of the ceramic layer 12.

The studs 52 of the anchors are substantially coaxial with the bore portion 22 of the anchor receiving structure 18. Here the relative dimensions are not particularly critical so long as there does exits a coaxial relationship between the two elements. During a surface impact, each of the ceramic tiles 14 is capable of independent temporary resilient displacement with respect to the energy absorbing layer 30 along the anchor 50 (i.e., the tile effectively "rides" or travels along the stud 52 on impact).

The stud head 54 may have a variety of configurations (FIGS. 2 & 3), however in all cases it is important that the stud head 54 cooperatively engage the socket 20 of the anchor receiving structure 18, either directly as shown or indirectly as by silicone or other sealant. Furthermore, when so engaged, the stud head 54 should preferably sit or rest below the top surface 15 of the ceramic tile 14 so as to prevent or minimize direct impacting contact with the stud head 54. Preferably the stud head 54 cushioningly supports a substantially abrasion resistant cap or cover 56. The cap 56 may have a flat bottom 57 or it may be shaped to substantially conform to the stud head 54. Alternately, the material comprising the energy absorbing layer 30 may be used in lieu of a stud cap 56 to form a substantially continuous surface for the composite structure 10 (i.e., used a "grout" to fill surface imperfections).

The base layer 40 may comprise a steel plate 42 or an expanded metal sheeting (not shown). The base layer 40 of the composite structure 10 is effectively but not exclusively a structural member. The quality and character of the base layer 40 is dictated by factors such as weight, strength, cost etc. Typically, steel plates having a thickness of between about 1 to 5 millimeters have proven effective for a variety of applications, while alternate thicknesses are equally suitable in practice.

Like the ceramic tile of the ceramic layer, the base layer may be pre-treated for affixedly receiving the resilient energy absorbing layer in an effort to achieve maximum structural integrity of the composite. The pretreatment step primarily includes the roughening of the base layer surface, for example by sand blasting or other well know techniques.

Figure 5:
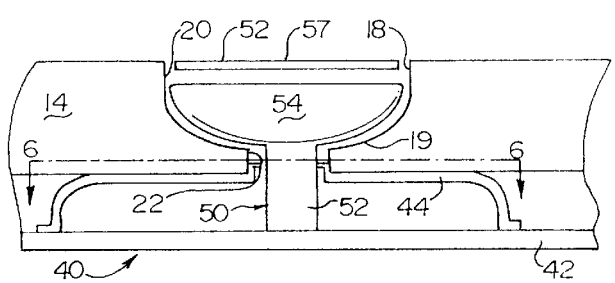
FIG. 5 is a view similar to that of FIG. 2 illustrating a specific base layer configuration.
Figure 6:
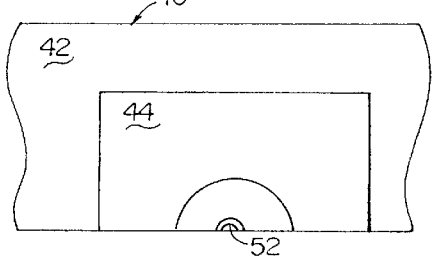
FIG. 6 is a sectional view along line 6—6 of FIG. 4 showing the relationship between the ceramic tile anchors and the specific base layer configuration.

In applications requiring superior impact resistance, the base layer 40 may further comprise a spring plate 44, as illustrated in FIGS. 5 & 6, affixed to the steel plate 42. The spring plate 44 is essentially a contoured metallic element which substantially functions as a leaf or disk spring. Preferably the spring plate 44 is welded to the steel plate 42, however other methods of affixation may be more suitable or appropriate, based upon the application. Here, the ceramic tile 14 does not exclusively "float" or rest upon the adjacent energy absorbing layer 30 but in fact rests or sits upon a portion of the spring plate 44, notably in the vicinity of the stud 52 of the tile anchor 50. The impact resistance of the ceramic tile is greatly enhanced thereby, while retaining enough overall "cushion" to prevent damage to the tiles upon surface impact.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A resilient abrasion resistant composite wear panel comprising:
   (a) a ceramic layer of spaced apart ceramic tiles, each of said spaced apart ceramic tiles having a top surface, a bottom surface opposite said top surface, and at least a single anchor receiving structure therethrough forming a passage from said top surface to said bottom surface of each of said spaced apart ceramic tiles;
   (b) a base layer substantially parallel with said ceramic layer;
   (c) a resilient energy absorbing layer substantially separating said ceramic layer from said base layer and separating each of said spaced apart tiles from each other; and,
   (d) ceramic tile anchors linking each of said spaced apart ceramic tiles to said base layer via cooperative engagement with said anchor receiving structures such that each of said spaced apart ceramic tiles is capable of independent temporary resilient displacement along the length of said ceramic tile anchors upon a surface impact to said ceramic layer.

2. The composite wear panel of claim 1 wherein said anchor receiving structure comprises a socket partially extending from said top surface of each of said spaced apart ceramic tiles toward said bottom surface of each of said spaced apart ceramic tiles and a bore extending from said socket to said bottom surface of each of said spaced apart ceramic tiles.

3. The composite wear panel of claim 2 wherein said ceramic tile anchors comprise spaced apart studs upwardly extending from said base layer, each of said spaced apart studs having a stud head fixed thereupon, said stud head in engagement with said socket of said anchoring receiving structure, said stud being coaxial with said bore of said anchor receiving structure.

4. The composite wear panel of claim 3 wherein at least the bottom surface of each of said spaced apart ceramic tiles have been pre-treated to affixedly receive said resilient energy absorbing layer.

5. The composite wear panel of claim 4 wherein said base layer has been pre-treated to affixedly receive said resilient energy absorbing layer.

6. The composite wear panel of claim 5 wherein said base layer comprises a steel plate.

7. The composite wear panel of claim 6 wherein said base layer further includes a spring plate in planar abutment with said steel plate, said bottom surface of said tile being in contact with a portion of said spring plate.

8. The composite wear panel of claim 3 wherein said stud head and said socket are configured to be substantially concave.

9. The composite wear panel of claim 3 wherein said stud head and said socket have angular cross sections.

10. The composite wear panel of claim 3 wherein said stud head and said socket have arcuate cross sections.

11. The composite wear panel of claim 2 wherein said socket has a decreasing dimension throughout its depth.

12. The composite wear panel of claim 2 wherein said socket has a uniform dimension throughout its depth.

13. The composite wear panel of claim 1 wherein said energy absorbing layer comprises a polymerized elastomer.

14. The composite wear panel of claim 1 wherein said energy absorbing layer comprises natural rubber.

15. A method of securing ceramic tile in an energy absorbing composite wear structure comprising the steps of:
(a) providing a plurality of discrete ceramic tiles having a top surface, a bottom surface opposite said top surface, and at least a single anchor receiving structure therethrough;
(b) providing a structural base member equipped with upward projecting spaced apart ceramic tile anchors permitting a fixed travel length for each ceramic tile of said plurality of discrete ceramic tiles;
(c) anchoring each ceramic tile of said plurality of discrete ceramic tiles to each of said ceramic tile anchors of said structural base member; and,
(d) providing a resilient energy absorbing compound to substantially separate each ceramic tile of said plurality of discrete ceramic tiles from each other and from said structural base member such that each ceramic tile of said plurality of discrete ceramic tiles is capable of travel upon said resilient energy absorbing layer along the length of said spaced apart ceramic tile anchors.

16. The method of claim 15 further comprising the step of pretreating each ceramic tile of said plurality of discrete ceramic tiles for affixidely receiving said resilient energy absorbing compound.

17. The method of claim 16 wherein said step of pretreating each ceramic tile of said plurality of discrete ceramic tiles includes etching and priming at least the bottom surface of each ceramic tile of said plurality of discrete ceramic tiles.

18. The method of claim 15 further comprising the step of pretreating said structural base member for affixidely receiving said resilient energy absorbing compound.

19. The method of claim 18 wherein said step of pretreating said structural base member includes roughening the upper surface of said base layer.

* * * * *